(12) United States Patent
Oda et al.

(10) Patent No.: US 6,975,624 B1
(45) Date of Patent: Dec. 13, 2005

(54) NETWORK INTERWORKING DEVICE FOR LAN/INTERNET

(75) Inventors: Toshikane Oda, Tokyo (JP); Hideaki Yamada, Tokyo (JP); Tohru Asami, Saitama (JP)

(73) Assignee: Kokusai Denshin Denwa Co., Ltd., Tokyo (JP)

( * ) Notice: Subject to any disclaimer, the term of this patent is extended or adjusted under 35 U.S.C. 154(b) by 0 days.

(21) Appl. No.: 09/169,962

(22) Filed: Oct. 13, 1998

(30) Foreign Application Priority Data

Oct. 14, 1997 (JP) .................................. 9-295029

(51) Int. Cl.[7] ........................ H04L 12/66; H04L 12/56; H04J 3/24; H04J 3/16
(52) U.S. Cl. ...................... 370/354; 370/401; 370/474; 370/466
(58) Field of Search .................. 370/395.52, 400–404, 370/476, 470–474, 394, 410–412, 428–429, 370/465–466, 468, 229, 395.5, 352–354

(56) References Cited

U.S. PATENT DOCUMENTS

| | | | |
|---|---|---|---|
| 4,744,080 A * | 5/1988 | Brennand et al. ........... | 380/212 |
| 5,056,088 A * | 10/1991 | Price et al. ................. | 370/466 |
| 5,384,770 A * | 1/1995 | Mays et al. ................ | 370/300 |
| 5,751,700 A * | 5/1998 | Imaeda ....................... | 370/263 |
| 5,764,645 A * | 6/1998 | Bernet et al. ............... | 370/466 |
| 5,859,853 A * | 1/1999 | Carlson ...................... | 370/468 |
| 5,954,799 A * | 9/1999 | Goheen et al. ............. | 709/250 |
| 5,987,022 A * | 11/1999 | Geiger et al. ............... | 370/349 |
| 6,041,054 A * | 3/2000 | Westberg .................... | 370/389 |
| 6,052,819 A * | 4/2000 | Barker et al. ............... | 370/473 |
| 6,084,888 A * | 7/2000 | Watanabe et al. .......... | 370/473 |
| 6,169,734 B1 * | 1/2001 | Wilson ....................... | 370/352 |
| 6,205,124 B1 * | 3/2001 | Hamdi ........................ | 370/260 |
| 6,295,293 B1 * | 9/2001 | Tonnby et al. ............. | 370/389 |

OTHER PUBLICATIONS

Newton, Newton's Telecom Dictionary, Jan. 1998, Telecom Books and Flatiron Publishing, 13th Edition, p. 63-64.*
Newton, Newton's Telecom Dictionary, 1996, Flatiron Publishing, p. 526.*

* cited by examiner

Primary Examiner—Chi Pham
Assistant Examiner—Ronald Abelson
(74) Attorney, Agent, or Firm—Arent Fox PLLC (57) ABSTRACT

A network interworking device used in a communication system which has a first communication network with an IP, a second communication network and a plurality of other network interworking devices connected to the first communication network, the network interworking device being connected between the first communication network and the second communication network for converting IP packets communicated in the first communication network and information signals communicated in the second communication network with each other. The network interworking device includes a packet assembler unit for assembling information signals of a plurality of calls received from the second communication network into a single IP packet when the plurality of calls are to be transmitted to the same network interworking device.

14 Claims, 8 Drawing Sheets

Fig. 5B

NETWORK INTERWORKING DEVICE FOR LAN/INTERNET

FIELD OF THE INVENTION

The present invention relates to a network interworking device connected between a communication network with an internet protocol (IP) and another communication network.

DESCRIPTION OF THE RELATED ART

An internet telephone system has in general network interworking devices called as gateways each of which is connected between a telephone-network and a LAN/internet with the IP to switch a plurality of voice calls. The gateway segments the voice signals of the respective calls from the telephone-network into individual packets, adds IP packet headers to the respective packets, and then transmits the packets to a receive-side gateway. The gateway therefore executes these operations even when the voice signals of the plurality of calls are to be transmitted to the same receive-side gateway. A transmit-side gateway transmits the IP packet with a payload containing a voice signal segment of the single call and an identifier information for identifying this call to the receive-side gateway. The receive-side gateway identifies the call in accordance with the identifier information and concatenates the received voice signal segments belonging to the same call so as to reproduce a continuous digital voice signal.

There is a voice channel multiplexing device using ATM technique. This multiplexing device adds, to the voice signal segment of each call, a header with an identifier information for identifying this call so as to form voice signal short cells, multiplexes the voice signal short cells of the respective calls in progress in a payload of a single ATM cell, and then transfers the ATM cell.

However, according to the conventional gateway, as aforementioned, a common IP header is given to the respective voice signal packets of a plurality of calls even when this gateway transmits the plurality of calls in progress to the same gateway. Thus, communication resources are not necessarily efficiently used.

Since the conventional voice channel multiplexing device using short cells is a device dedicated to the ATM transmission, its cell length is fixed. Therefore, if the length of the short cell is selected long, it may be necessary to segment one short cell into a plurality of segmented short cells which will be accommodated in the adjacent cells. This causes segmentation processes executed before transmission in the transmit-side and receive-side equipments to complicate. In addition, since the same cell header is inserted at a fixed interval corresponding to the ATM cell length when a plurality of calls are connected to transmit voice signals between the ATM voice channel multiplexing devices, communication resources are also inefficiently used.

SUMMARY OF THE INVENTION

It is therefore an object of the present invention to provide a network interworking device, whereby when information signals of a plurality of calls are transmitted to the same receive-side network interworking device, overhead of bandwidth occupied by IP packet headers can be decreased.

According to the present invention, a network interworking device used in a communication system which has a first communication network with an IP, a second communication network and a plurality of other network interworking devices connected to the first communication network, the network interworking device being connected between the first communication network and the second communication network for converting IP packets communicated in the first communication network and information signals communicated in the second communication network with each other is provided. The network interworking device includes a packet assembler unit for assembling information signals of a plurality of calls received from the second communication network into a single IP packet when the plurality of calls are to be transmitted to the same network interworking device.

Thus, when information signals of a plurality of calls are transmitted to the same receive-side network interworking device, an IP packet with less overhead can be obtained causing overhead of bandwidth occupied by IP packet headers to decrease. Therefore, communication resources can be efficiently utilized.

It is preferred that the IP packet includes a plurality of short packets with respect to the information signals of the respective calls received from the second communication network, and that a header of each of the short packets has a communication channel number of each call.

It is also preferred that an acceptable period for packet transmission is predetermined, and that the packet assembler unit assembles sequential information signals of the plurality of calls received from the second communication network into a single IP packet, within a period between a first time when an information signal of one of the calls is generated and a second time when the acceptable period has lapsed from the first time. Thus, the maximum delay for packet transmission between the network interworking devices can be defined.

It is preferred that the IP packet includes a plurality of short packets with respect to the information signals of the respective calls received from the second communication network, that a deadline for short packet transmission is determined for each short packet, and that the packet assembler unit transmits the IP packet to the first communication network when the deadline of any one of the short packets assembled in the IP packet expires during the assembling of the short packets. Thus, the maximum delay for packet transmission between the network interworking devices can be defined for each call.

It is also preferred that the second communication network is a telephone-network, and that the network interworking device further includes a coding unit for encoding the information signals of the respective calls received from the second communication network, the coded information signals being transferred to the packet assembler unit.

It is preferred that the network interworking device further includes a packet disassembler unit for disassembling an IP packet received from the first communication network into information signals of a plurality of calls.

In this case, preferably the second communication network is a telephone-network, and the network interworking device further includes a decoding unit for decoding the information signals of the respective calls disassembled by the packet disassembler unit, the decoded information signals being transmitted to the telephone-network.

It is preferred that the second communication network is a telephone-network, and that the network interworking device further includes a plurality of coding units for encoding the information signals of the respective calls received from the second communication network in accordance with different coding systems, the coded information signals being transferred to the packet assembler unit.

It is preferred that the IP packet includes a plurality of short packets with respect to the information signals of the respective calls received from the second communication network, that a header of each of the short packets has an coding system identifier, and that one of the coding units and a short packet length are selected depending upon the identifier.

It is also preferred that the network interworking device further includes a communication channel monitor unit for automatically detecting contents of the information signals of the respective calls received from the second communication network, and a coding system change order unit for instructing to select an optimum coding system depending upon the detected contents.

In this case, preferably the network interworking device further includes a congestion monitor unit for monitoring congestion status of the first communication network, the congestion monitor unit judges whether it is in congestion status of the first communication network depending upon an inter-arrival time of the IP packets or upon a loss ratio of the IP packets, and instruct a judged result to the coding system change order unit.

The coding system is adaptively and automatically selected depending upon the contents of the information signals of the calls and the congestion status of internet. Thus, during the time when the number of calls in progress is low, bandwidth allocated for each call is increased to expect improved quality of communication. During the time when the number of calls in progress is high, on the other hand, the bandwidth is decreased to increase the maximum acceptable number of calls.

It is also preferred that the network interworking device further includes a plurality of decoding units for decoding the information signals of the respective calls disassembled by the packet disassembler unit in accordance with different coding systems, the decoded information signals being transmitted to the telephone-network.

Further objects and advantages of the present invention will be apparent from the following description of the preferred embodiments of the invention as illustrated in the accompanying drawings.

BRIEF DESCRIPTION OF THE DRAWINGS

FIG. 3, which is constituted by combining

FIG. 4, which is constituted by combining FIG. 5, which is constituted by combining

DESCRIPTION OF THE PREFERRED EMBODIMENTS

Figure 1:
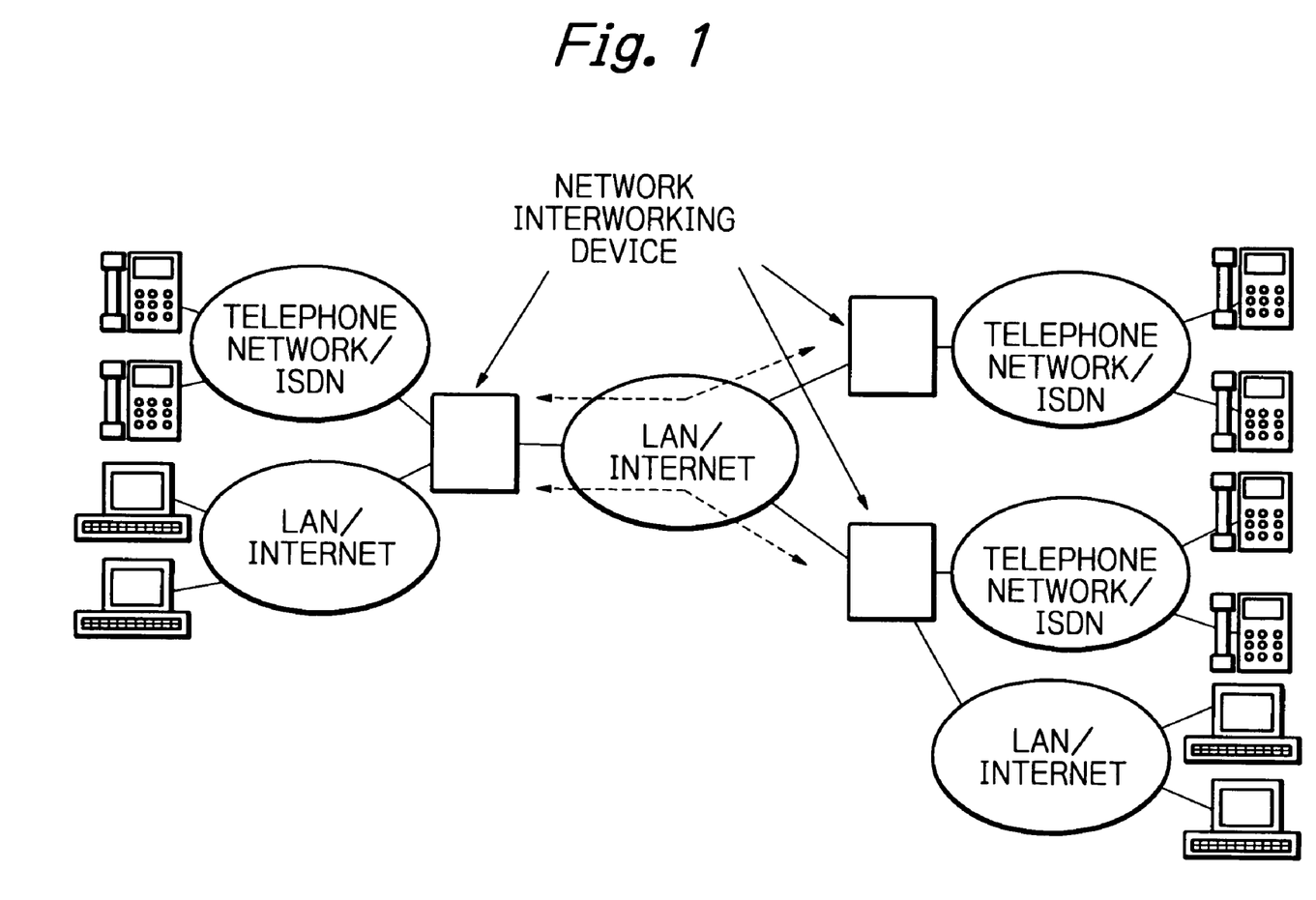
FIG. 1 illustrates a communication system using a network interworking device according to the present invention.

As shown in FIG. 1, the communication system has a plurality of network interworking devices each of which is connected between a common LAN/internet and a switched circuit network such as telephone-network/ISDN or a LAN/internet. The switched circuit network in this case targets voice-band data calls including voice calls or facsimile calls, or unrestricted ISDN 64 kbps bearer calls. Hereinafter, a network interworking device particularly used in an internet telephone system, provided between an internet and a telephone-network is referred as a gateway. If information signals of calls connected to this gateway are analog signals such as voice signals or facsimile signals, it will be necessary to provide a coding/decoding unit for digitalizing the analog signals.

Figure 2:
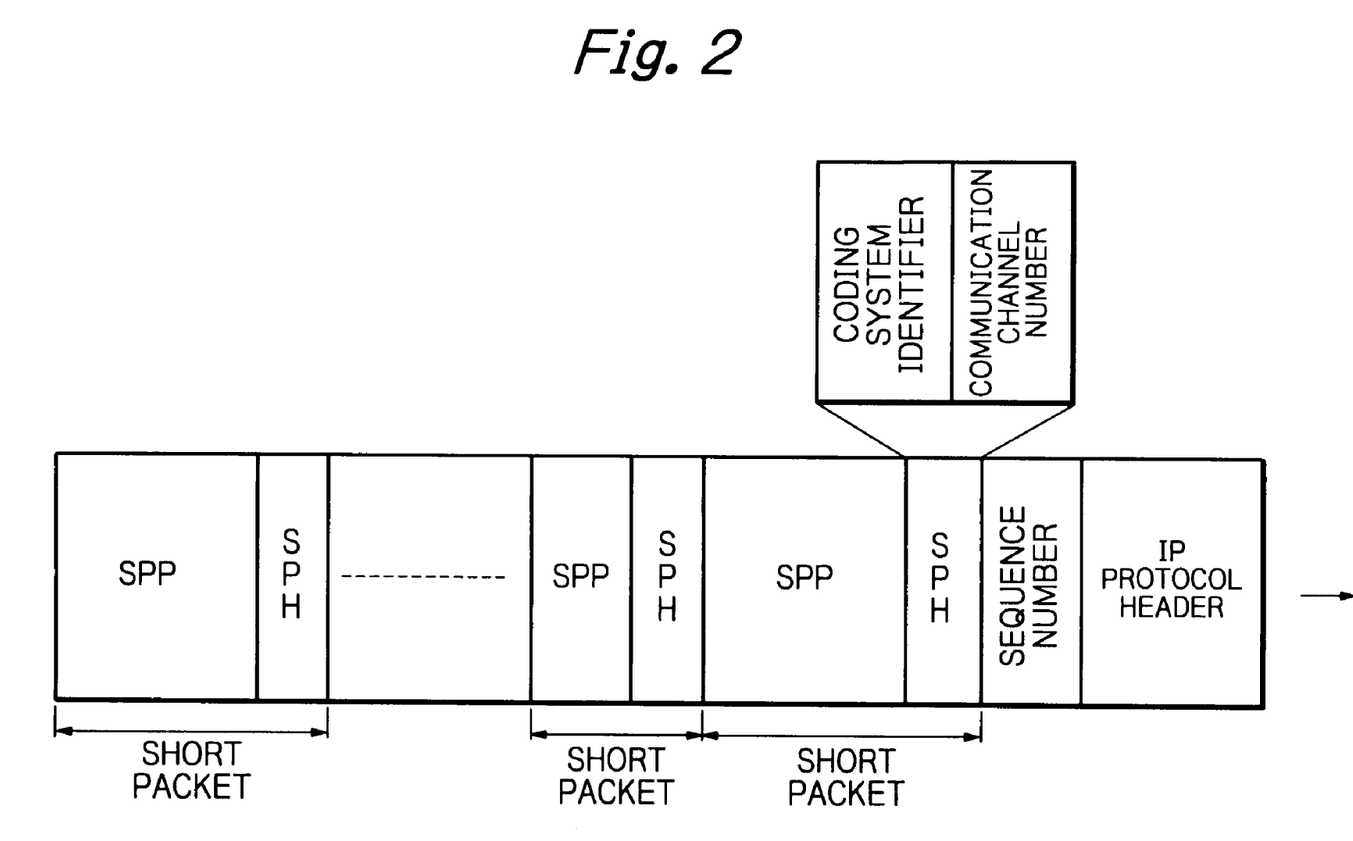
FIG. 2 illustrates a format of an IP packet transmitted between the network interworking devices according to the present invention.

As shown in FIG. 2, an IP packet with an IP protocol header and a sequence number accommodates information signals of at least one call as at least one short packet. Each short packet is composed of a short packet header (SPH) and a short packet payload (SPP). In the short packet header, a communication channel number of the call and a coding system identifier of the information signal in the short packet payload are provided.

Preferred First Embodiment

Figure 3A:
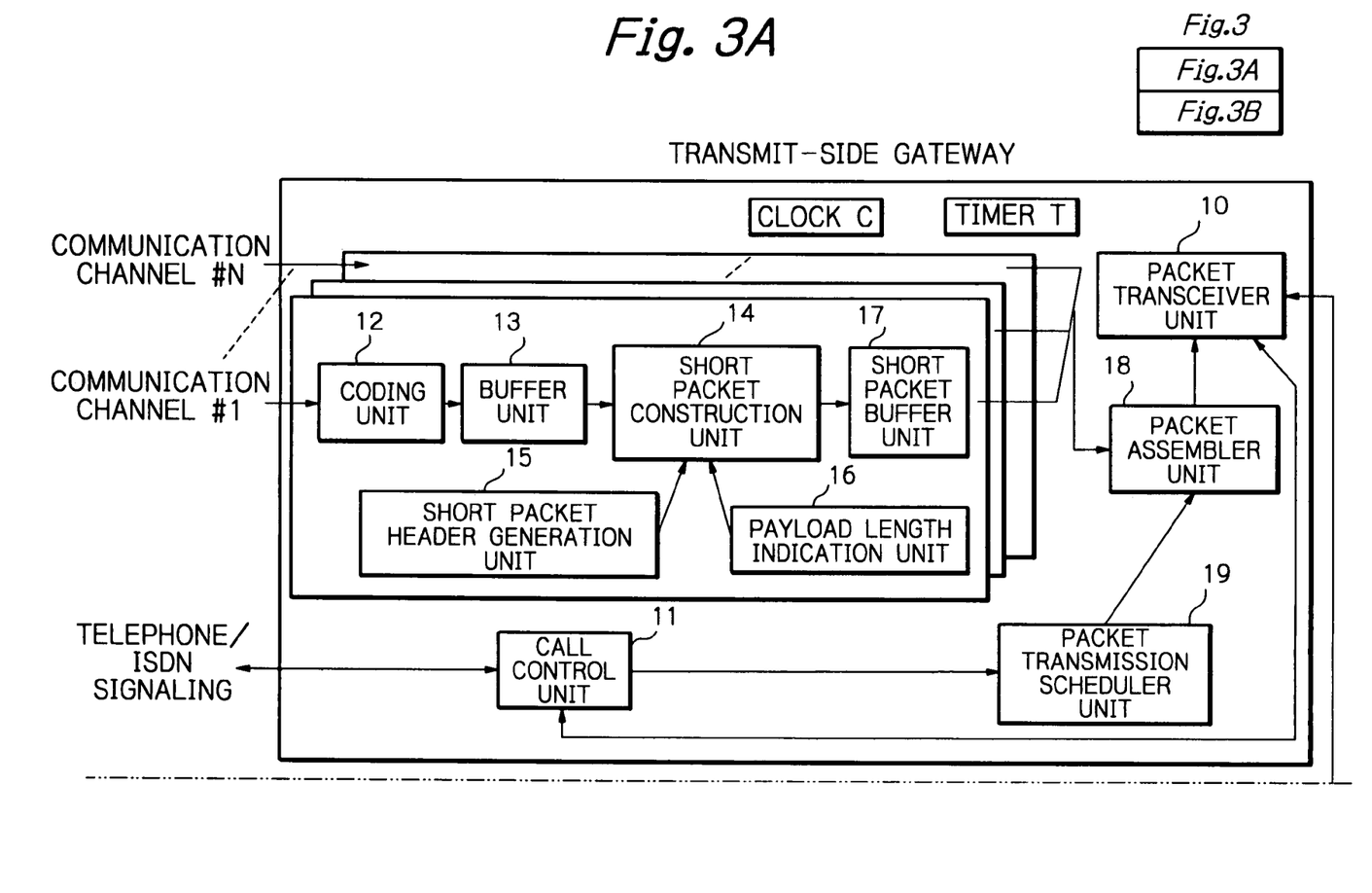
FIGS. 3A and 3B, illustrates a preferred first embodiment of the network interworking devices according to the present invention.
Figure 3B:
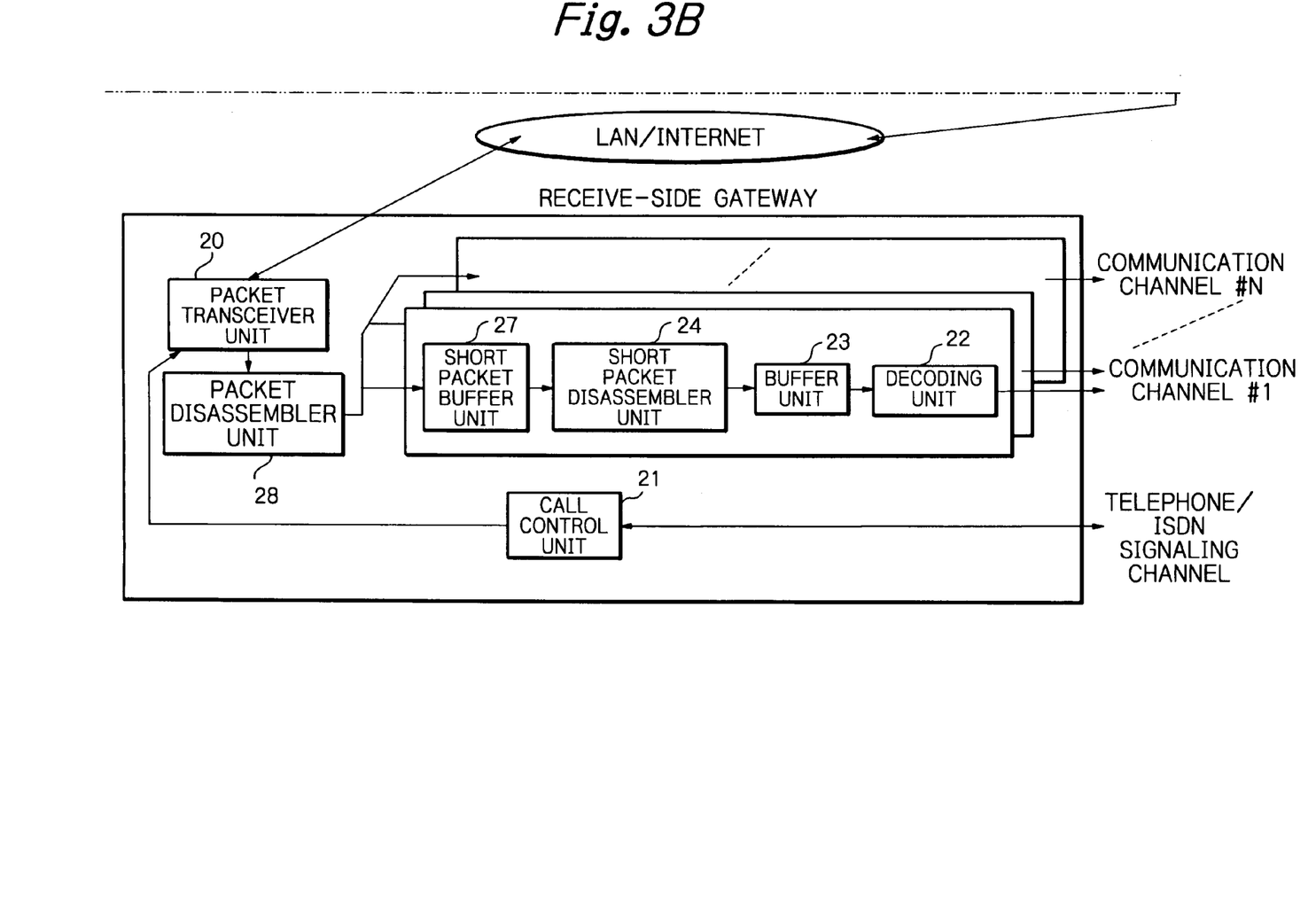

The transmit-side gateway has, as shown in FIG. 3, coding units 12, buffer units 13, short packet construction units 14, short packet header generation units 15, payload length indication units 16 and short packet buffer units 17, which operate in parallel for the respective calls. The transmit-side gateway also has a call control unit 11, a packet assembler unit 18, a packet transmission scheduler unit 19 and a packet transceiver unit 10. The receive-side gateway has decoding units 22, buffer units 23, short packet disassembler units 24 and short packet buffer units 27, which operate in parallel for the respective calls. The receive-side gateway has also a call control unit 21, a packet disassembler unit 28 and a packet transceiver unit 20.

In FIG. 3, in order to provide easy understanding, it is illustrated that each gateway has either the transmit-side gateway function or the receive-side gateway function. However, since the packets are bidirectionally transmitted in the form of full-duplex communication, each of the gateways according to the present invention has both of the transmit-side and receive-side functions.

Call Set-up Sequence

Call set-up sequence is as follows. When a terminal connected to the telephone-network origins a call and this call arrives at the origin-side gateway, the call control unit 11 in the origin-side gateway receives a telephone number of a destination terminal of the call from the origin terminal, and then obtains an internet address of the destination-side gateway.

Thereafter, the call control unit 11 communicates with the call control unit 21 in the destination-side gateway, connects the call between the origin-side and destination-side gateways and determines a specified coding system of the communication. Alternately, a coding system predetermined between the gateways may be used. The destination-side gateway places a call to the telephone-network using the destination, telephone number which is designated by the originated call and connects the call to the destination terminal. When the destination terminal answers, communication between the origin and destination terminals is started.

It should be noted that the present invention exerts its advantages when n−1 ($N \geq n \geq 1$) calls in progress are connected between the origin-side gateway and the destination-side gateway, where N is the smaller one of the numbers of lines accommodated in the origin-side gateway and the destination-side gateway according to the present invention.

Operation at the Transmit-Side Gateway

In the transmit-side gateway, the voice signal of the call via the communication channel is applied to the coding unit 12. The coding unit 12 encodes the voice signal into a digital coded signal in accordance with one of coding systems such as ITU-T Standard G.711, G.723, G.726 and G.729. The silence part of the voice signal is compressed and thus only the active voice signal is encoded.

The coded signal from the coding unit 12 is applied to the buffer unit 13 and temporally stored therein. The short packet construction unit 14 gets a short packet header for the coded signal of the call from the short packet header generation unit 15. The unit 14 also gets a payload length of the short packet for the coded signal from the payload length indication unit 16, and then extracts from the buffer unit 13 a part of the coded signal with the payload length as a segment. As shown in FIG. 2, the short packet composed of the short packet header (SPH) and the short packet payload (SPP) is provided for each call. In the short packet header, a communication channel number and a coding system identifier are provided. The short packet construction unit 14 transfers the constructed short packet to the short packet buffer unit 17.

At this time, a time of short packet generation and a deadline for packet transmission are added to the short packet as tags. The time of short packet generation indicates a time of inputting the constructed first short packet into the buffer unit 17, and the deadline for packet transmission indicates a deadline of transmitting the short packet from the packet assembler unit 18 to the packet transceiver unit 10. The time of inputting the first short packet is read out from the clock C in the gateway. These tags are discarded from the short packet when this short packet is fetched from the assembler unit 18.

Table 1 is a call information table stored in the packet transmission scheduler unit 19.

TABLE 1

| NAME OF RECEIVE-SIDE GATEWAY | ADDRESS OF RECEIVE-SIDE GATEWAY | COMMUNICATION CHANNEL NUMBER NOW CONNECTED (VOICE CHANNEL NUMBER AT GW1) | ACCEPTABLE PERIOD FOR PACKET TRANSMISSION |
|---|---|---|---|
| GW2 | LAN ADDRESS 2 | CH#1, CH#4, CH#8 | 10 msec |
| GW3 | LAN ADDRESS 3 | CH#2, CH#3, CH#10, CH#21, CH#22 | 32 msec |
| GW4 | LAN ADDRESS 4 | CH#5, CH#12, CH#12, CH#19 | 20 msec |
| . | . | . | . |
| . | . | . | . |
| . | . | . | . |

This table represents relationships among name and address of the receive-side gateway, communication channel number or each channel number, and acceptable period for packet transmission which indicates the minimum period for transmitting the short packet determined by the gateways. The table is updated at each connection and disconnection of the call. The scheduler unit 19 indicates a header information of a packet to be constructed next and a communication channel number to be stored in the packet, to the packet assembler unit 18.

Thus, the assembler unit 18 obtains an internet address of the receive-side gateway and a communication channel number of the call now connected between the transmit-side and receive-side gateways. Then, the assembler unit 18 generates an IP packet header and constructs a payload so as to assemble an IP packet. The payload is constructed by checking the time of short packet generation and deadline for packet transmission indicated in the tags of the short packets stored in the respective short packet buffer units 17 which correspond to the communication channel numbers and by extracting the short packets in order of the generation time from the buffer units 17.

Figure 4A:
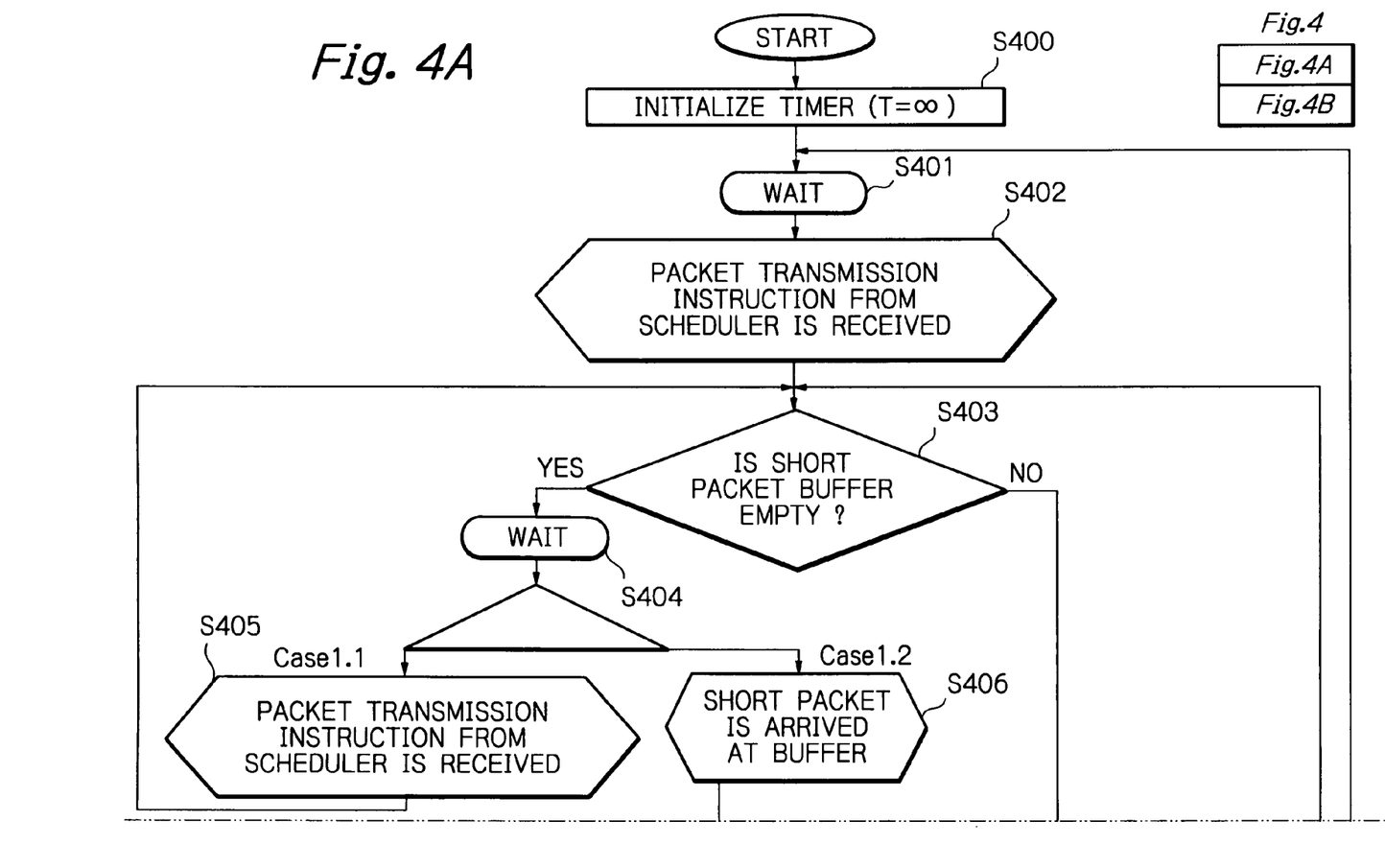
FIGS. 4A and 4B, illustrates a flow chart of a packet assembler unit in the embodiment of FIG. 3.
Figure 4B:
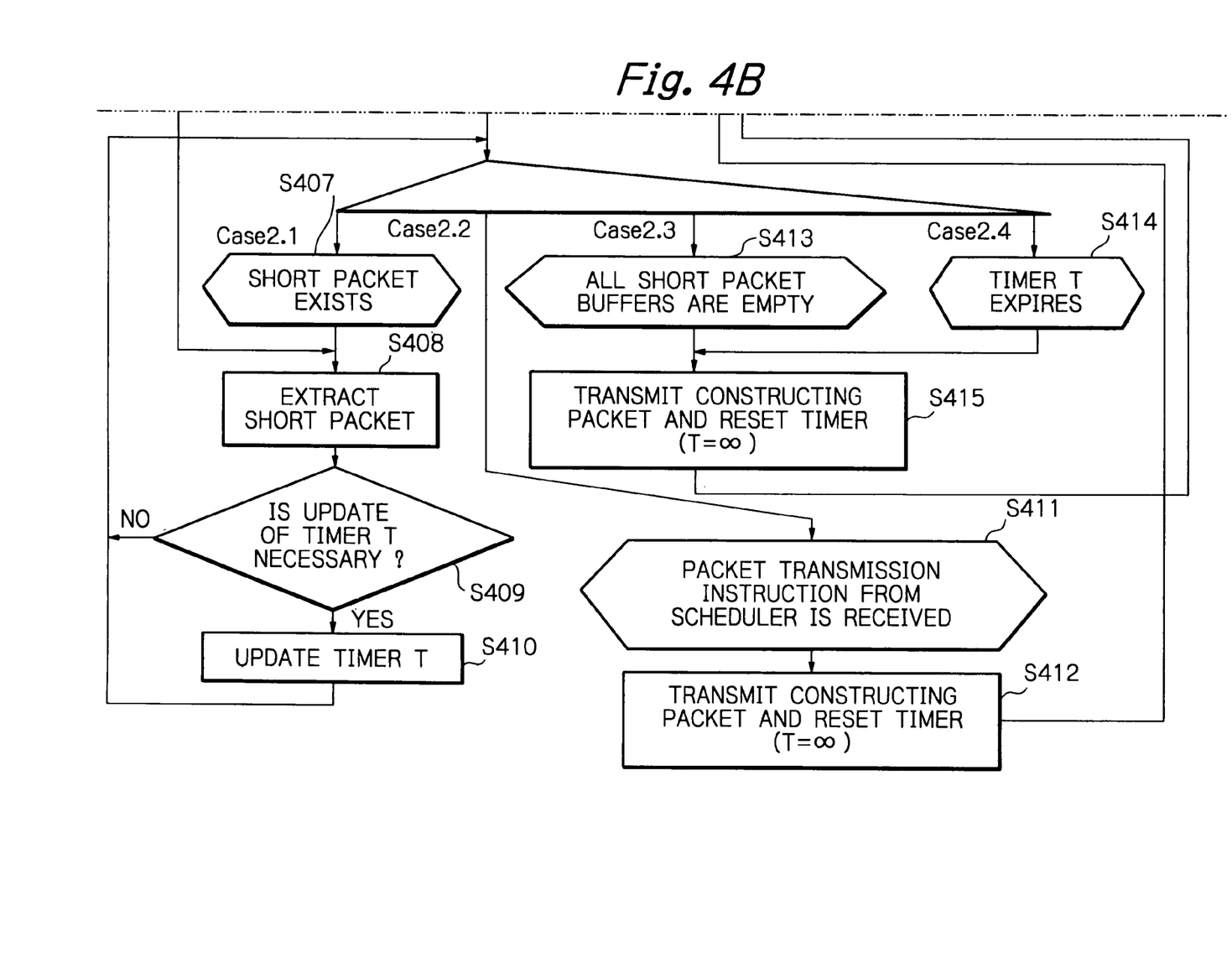

Referring to the flow chart of FIG. 4, the operation of this assembler unit 18 is described in detail.

First, a timer T for monitoring the deadline of packet transmission is defined and initialized as T=∞ (S400). This timer T represents a remaining period of time until the short packet is transmitted and decreases in synchronization with the clock period.

Then, possible receipt of a packet transmission instruction from the scheduler unit 19 is waited (S401). After the packet transmission instruction from the scheduler unit 19 is received (S402), it is judged whether the corresponding short packet buffer unit 17 is empty or not (S403).

If the buffer unit 17 is empty, receipt of packet transmission instruction from the scheduler unit 19 or arrival of the short packet at the buffer unit 17 is waited (S404). When the packet transmission instruction from the scheduler unit 19 is received (S405, Case 1.1), the current packet header is discarded and it is judged whether the corresponding buffer unit 17 is empty or not (S403). On the other hand, when a new short packet arrives at any one of the buffer units 17 of the corresponding communication channel (S406), this short packet is extracted from the buffer unit 17 and applied to the payload of the IP packet (S408).

If it is judged that the buffer unit 17 is not empty (S403), namely a short packet exists (S407, Case 2.1), this short packet is extracted from the buffer unit 17 and applied to the payload (S408).

When the first short packet (m=1) is extracted from the buffer unit 17, the difference W(1) between the instant time Q and the deadline for packet transmission P(1) described in the tag of the short-packet is calculated as W(1)=P(1)−Q. Then, it is judged whether the difference W(1) is smaller than the timer T (S409). If smaller, the timer T is updated to T= W(1) (S410). Since T=∞ when the first short packet is generated, the timer T is set to W(1) without exception.

When the m-th short packet (m≧2) is extracted from the buffer unit 17, the difference W(m) between the instant time Q and the deadline for packet transmission P(m) described in the tag of the short packet is similarly calculated as W(m)=P(m)−Q. Then, it is judged whether the difference W(m) is smaller than the timer T (S409). If smaller (T>W(m)), the timer T is updated as T=W(m) (S410), otherwise the timer T is not updated.

Until any one of following events occurs, short packets are sequentially applied to the payload of the IP packet:
(1) the timer T is expired, namely it is the deadline for packet transmission (S414, Case 2.4);
(2) all the short packet buffer units 17 are empty (S413, Case 2.3); and
(3) a packet transmission instruction from the scheduler unit 19 is received (S411, Case 2.2).

When the timer T expires, in other words, at the deadline for short packet transmission (S414), the packet now being constructed is transmitted, the timer T is reset as T=∞

(S415), and then receipt of a packet transmission instruction from the scheduler unit 19 is waited again (S401).

Similar to this, when all the short packet buffer units 17 are empty (S413), the packet now being constructed is transmitted, the timer T is reset as T=∞ (S415), and then receipt of a packet transmission instruction from the scheduler unit 19 is waited again (S401).

When a packet transmission instruction from the scheduler unit 19 is received (S411), the packet now being constructed is transmitted, the timer T is reset as T=∞ (S412), and then it is judged whether the buffer unit 17 is empty or not (S403).

As soon as an IP packet is assembled, the packet assembler unit 18 transfers the assembled IP packet to the packet transceiver unit 10. The transceiver unit 10 then transmits the received IP packet to the internet.

Operation at the Receive-Side Gateway

The IP packet transmitted from the transmit-side gateway is received at the packet transceiver unit 20 in the receive-side gateway. The received IP packet is transferred to the packet disassembler unit 28.

The disassembler unit 28 disassembles the received IP packet into short packets. Then the unit 28 reads out the communication channel numbers described in the short packet headers of the respective short packets, and transfers these short packets to the corresponding short packet buffer units 27, respectively.

The short packet disassembler unit 24 extracts the short packet and disassembles it into a short packet header and a short packet payload. Then, the disassembler unit 24 transfers the coded signals in the short packet payload to the buffer unit 23. The buffer unit 23 inserts a fill-in signal such as a signal indicating silence between the immediately preceding segment and the current segment.

The decoding unit 22 sequentially decodes the coded signals extracted from the buffer unit 23 to convert into analog signals for the telephone-network, and transmits the voice signals to the destination terminal of the call.

Preferred Second Embodiment

In this embodiment, an optimum coding system for the content of the information signal can be selected for each communication channel during communication of the call.

Figure 5A:
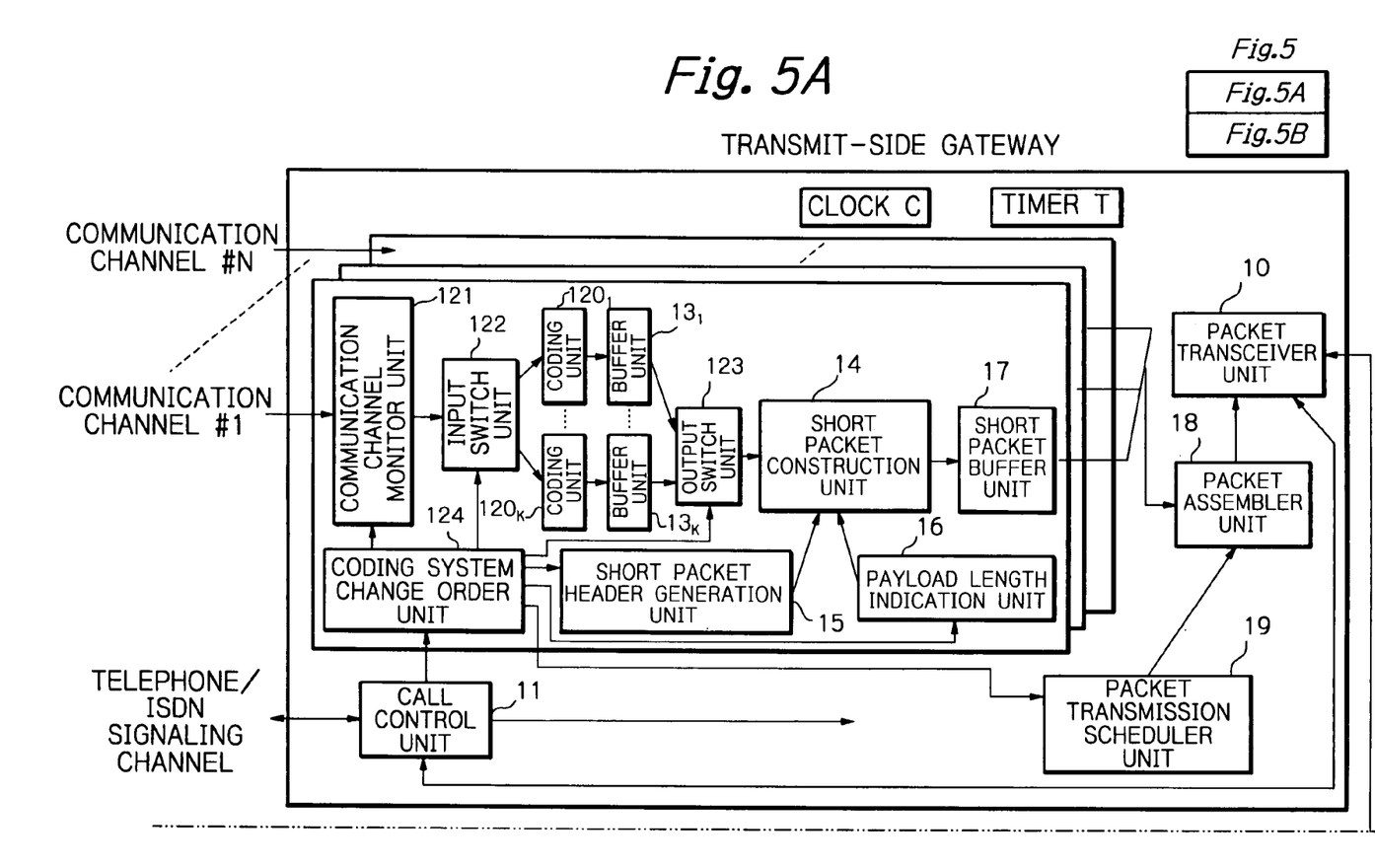
FIGS. 5A and 5B, illustrates a preferred second embodiment of the network interworking devices according to the present invention.
Figure 5B:
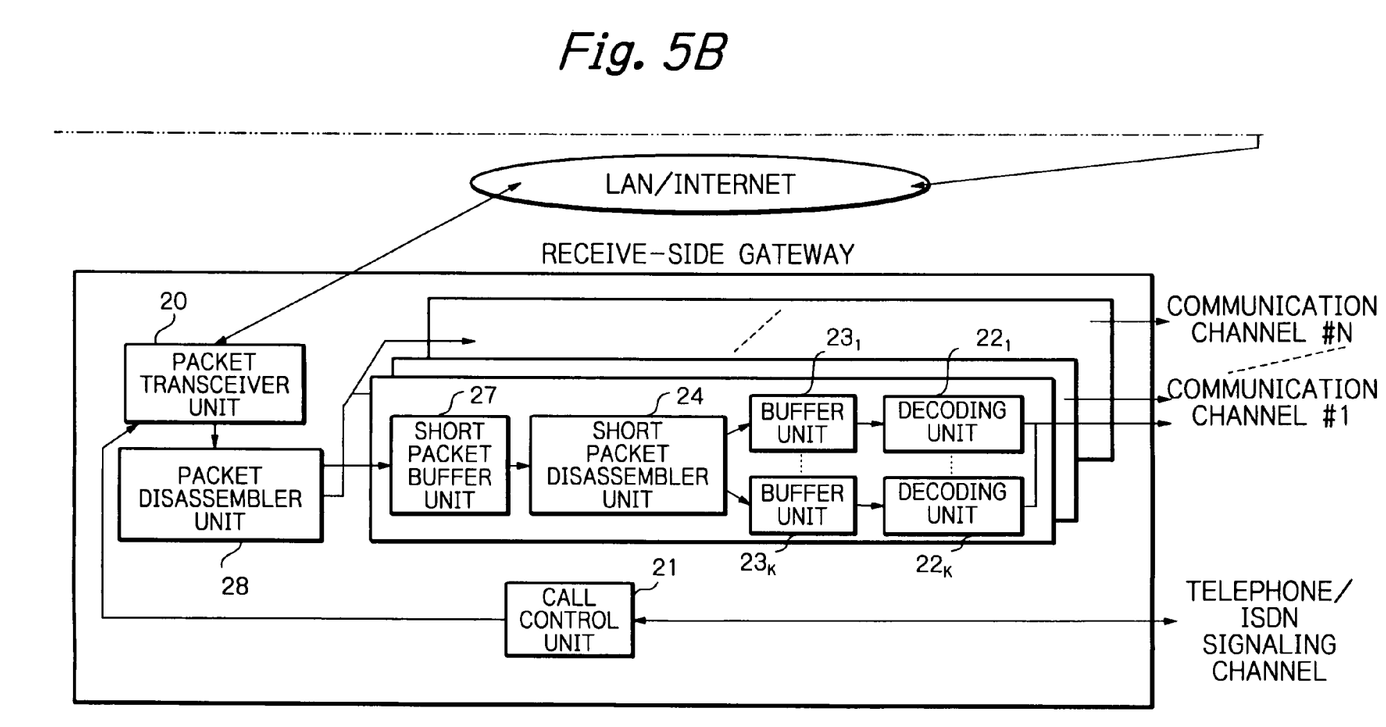

In addition to the constitution of the first embodiment, the transmit-side gateway has, as shown in FIG. 5, K coding units $120_1$ to $120_K$ which operate different coding algorithms for one communication channel, K buffer units $13_1$ to $13_K$ a communication channel monitor unit 121, an input switch unit 122, an output switch unit 123 and a coding system change order unit 124. On the other hand, the receive-side gateway has, in addition, K decoding units $22_1$ to $22_K$ which operate different coding algorithms for one communication channel and K buffer units $23_1$ to $23_K$.

After set-up of a fresh call is completed and communication is started, the default system is automatically selected as a coding system of communication channel in a direction. For example, the default system of 32 kbps ADPCM for facsimile call may be selected. The input and output switch units 122 and 123 selects the route of the received voice signal so that this signal is applied to one of the coding units $120_1$ to $120_K$, which operates in the default coding system. Thus, the communication signal is transmitted by using the default coding system to the receive-side gateway.

The monitor unit 121 monitors the content of the communication signal in the corresponding communication channel. It is possible to monitor the communication contents in forward and backward communication channels. For example, since in the facsimile call, signals under the T.30 standard are bidirectionally transmitted between the terminals before the transmission of actual facsimile signal, the monitor unit 121 can judge whether it is a facsimile call of the T.30 standard using voice band or a voice call by monitoring the contents in the forward and backward communication channels. The monitor unit 121 then notifies the judged result to the coding system change order unit 124.

The order unit 124 may judge whether the current coding system is to be changed to another coding system depending upon the judged result from the monitor unit 121. For example, if the call is the facsimile call, it may be judged that the default 32 kbps ADPCM coding system is to be maintained. If the call is the voice call, it may be judged that the coding system is to be changed from the default 32 kbps ADPCM coding system to G729 (CS-ACELP) coding system.

The order unit 124 receives call type information of the fresh call during call set-up, such as case information of unrestricted 64 kbps call of ISDN or 3.4 kbps call, from the call control unit 11, and may judge the coding system in the communication channel assigned to this call depending upon the received information. For example, if it is a digital unrestricted 64 kbps bearer call of ISDN, 64 kbps PCM will be adopted. If the communication signal already coded by 64 kbps PCM is input, this signal will be passed as it is.

The order unit 124 has a table, shown as Table 2, which represents relationship between the call types and coding systems in order to select the coding system.

TABLE 2

| CONDITIONS | CODING SYSTEM |
|---|---|
| THE CALL IS UNRESTRICTED 64 kbps CALL | 64 kbps PCM |
| THE CALL IS FACSCIMILE CALL | 32 kbps ADPCM |
| THE CALL IS VOICE CALL | CS-ACELP |
| . | . |
| . | . |
| . | . |

The order unit 124 also determines the coding system to be used for the communication channel of the voice call, and orders route change to the input output switch units 122 and 123 based upon the determined result. The order unit 124 simultaneously notifies the coding system to be used, to the short packet header generation unit 15 of this communication channel.

When determining the coding system to be used, it is desired that the order unit 124 refers congestion status information of the LAN/internet and information with respect to the call in progress between the gateways.

Whether it is in congestion status or not may be judged by observing, at the packet transceiver unit 20 in the receive-side gateway, an inter-arrival time Y of packets from the transmit-side gateway. For example, if the inter-arrival time Y exceeds a threshold value S for M times successively, it can be judged that the route from the transmit-side gateway to the receive-side gateway is in congestion status.

Another method for judging whether it is in congestion status or not is to check, at the packet transceiver unit 20 in the receive-side gateway, sequence numbers of packets from the transmit-side gateway in order to monitor loss of packets in the internet. For example, the number of packets actually received Z is measured, a packet loss ratio L is calculated from $L=(X-Z)/X$, and then when $L<h$, it is judged that the route from the transmit-side gateway to the receive-side gateway is in congestion status, where X is the number of packets to be received and h is a predetermined threshold value for discriminating the congestion status.

When the packet transceiver unit 20 in the receive-side gateway judges that the route from the transmit-side gateway to the receive-side gateway is in congestion status, this unit 20 notifies this judged result to the order unit 124 in the transmit-side gateway via the call control unit 11, by using the signal transferring function. When receiving this notification, the order unit 124 changes the current coding system for all the communication channels of the voice calls in progress at that time in a direction from the transmit-side gateway toward the receive-side gateway, into another coding system with a lower rate than that of the current system. The coding system of calls other than the voice calls, such as facsimile calls, are not changed. The order unit 124 has a selection table of coding systems with respect to the congestion status information, shown as Table 3, and selects the coding system depending upon the contents of this table.

TABLE 3

| CONDITIONS | CODING SYSTEM IN NORMAL STATUS | CODING SYSTEM IN CONGESTION STATUS |
|---|---|---|
| THE CALL IS UNRESTRICTED 64 kbps CALL | 64 kbps PCM | 64 kbps PCM |
| THE CALL IS FACSCIMILE CALL | 32 kbps ADPCM | 32 kbps ADPCM |
| THE CALL IS VOICE CALL | 24 kbps ADPCM | 13 kbps ADPCM |
| THE CALL IS VOICE CALL | CS-ACELP | 2.5 kbps Vocodar |
| . | . | . |
| . | . | . |
| . | . | . |

Furthermore, the order unit 124 in the transmit-side gateway checks the types of calls in progress between the transmit-side gateway and the receive-side gateway at a start of the communication of every fresh call to obtain the number of voice calls C1 and the number of facsimile calls or of voice band data calls C2. Then, the unit 124 compares vector values (C1, C2) with predetermined threshold vector values (D1, D2). If C1≧D1 or C2≧D2, it is judged to change a lower rate coding system such as G.729 for the fresh voice call.

Then, the order unit 124 notifies the contents of the coding system change to the packet transmission scheduler unit 19. The scheduler unit 19 thus changes the acceptable period for packet transmission in Table 1 in accordance with a predetermined selection conditions represented for example in Table 4 which will be also provided in this unit 19.

TABLE 4

| CONDITIONS | SET-UP VALUE OF ACCEPTABLE PERIOD FOR PACKET TRANSMISSION |
|---|---|
| DEFAULT | 32 msec |
| 10 OR LESS COMMUNICATIONS OF ONLY CS-ACELP SYSTEM CALLS ARE UNDER COMMUNICATION | 50 msec |
| 11–20 COMMUNICATIONS OF ONLY CS-ACELP SYSTEM CALLS ARE UNDER COMMUNICATION | 40 msec |
| ONLY GSM SYSTEM CALLS ARE UNDER COMMUNICATION | 32 msec |
| FACSIMILE SYSTEM CALLS ARE UNDER COMMUNICATION | 10 msec |
| . | . |
| . | . |
| . | . |

When a coding system change order from the order unit 124 is received, the input and output switch units 122 and 123 selectively switch so that the voice signal is encoded in accordance with the selected coding system.

The short packet header generation unit 15 generates a short packet header (SPH) with a coding system identifier as shown in FIG. 2. This identifier has a value which represents the selected coding system indicated by the order unit 124.

The short packet disassembler unit 24 in the receive-side gateway disassembles the received short packet of the communication channel into a short packet header and a short packet payload, and at this time, reads out the coding system identifier from the short packet header. Then, the disassembler unit 24 transfers the coded communication signal segments in the extracted short packet payload to one of the buffer units $23_1$ to $23_K$, which corresponds to the read out identifier.

The decoding units $22_1$ to $22_K$ sequentially decode the coded voice signals continuously extracted from the respective buffer units $23_1$ to $23_K$ to convert into analog signals for the telephone-network, and transmit the decoded voice signals to the respective destination terminals of the calls, respectively.

The aforementioned embodiments of the network interworking device are described with respect to the internet telephone system with telephone-network-internet-telephone-network connection. However, according to the present invention, various modifications can be possible. For example, the present invention can be applied to various network interworking combinations such as telephone-network/ISDN network-internet-telephone-network/ISDN network connection, internet/LAN-internet-internet/LAN connection, and internet/LAN-internet-telephone-network/ISDN network connection. In addition, the communication terminal connected to the networks may be telephone terminals, facsimile terminals or computer terminals.

Many widely different embodiments of the present invention may be constructed without departing from the spirit and scope of the present invention. It should be understood that the present invention is not limited to the specific embodiments described in the specification, except as defined in the appended claims.

What is claimed is:

1. A network interworking device used in a communication system which has a first communication network provided with an internet protocol and adapted to be connected to a plurality of different users, a second communication network adapted to be connected to a plurality of different users, and a plurality of other network interworking devices each provided with the same functions as that of said network interworking device being connected between said first communication network and said second communication network for converting internet protocol packets communicated in said first communication network and information signals communicated in said second communication network with each other, said network interworking device comprising:
- a packet assembler means for assembling information signals of a plurality of calls received from the plurality of different users in said second communication network into a single internet protocol packet when said plurality of calls are to be transmitted to the same network interworking device;
- a coding means for encoding the information signals of the respective received from said second communication network, said coded information signals being transferred to said packet assembler means;
- a packet disassembler means for disassembling an internet protocol packet received from said first communication network into information signals of plurality of calls; and
- a decoding means for decoding the information signals of the respective calls disassembled by said packet disassembler means, said decoded information signals being transmitted to said second communication network,
- an acceptable period for packet transmission being determined according to the second communication network, said packet assembler means assembling sequential information signals of the plurality of calls received from the plurality of different users in said second communication network into a single internet protocol packet within a period between a first time when an information signal of one of said calls is generated and a second time when said acceptable period has lapsed from said first time, and
- wherein said network interworking device further comprises a plurality of coding means for encoding the information signals of the respective calls received from said second communication network in accordance with different coding systems, said coded information signals being transferred to said packet assembler means.

2. The device as claimed in claim 1, wherein said internet protocol packet includes a plurality of short packets with respect to the information signals of the respective calls received from said second communication network, and wherein a header of each of the short packets has a communication channel number of each call.

3. The device as claimed in claim 1, wherein said second communication network is a telephone-network.

4. The device as claimed in claim 3, wherein said internet protocol packet includes a plurality of short packets with respect to the information signals of the respective calls received from said second communication network, wherein a header of each of the short packets has a coding system identifier, and wherein one of said coding means and a short packet length are selected depending upon said identifier for assembling the short packets in the internet protocol packet.

5. The device as claimed in claim 3, wherein said network interworking device further comprises a communication channel monitor means for automatically defecting contents of the information signals of the respective calls received from said second communication network, and a coding system change order means for instructing to select an optimum coding system depending upon the defected contents.

6. The device as claimed in claim 5, wherein said network interworking device further comprises a congestion monitor means for monitoring congestion status of said first communication network, said congestion monitor means judges whether it is in congestion status of the first communication network depending upon an inter-arrival time of the internet protocol packets or upon a loss ratio of the internet protocol packets, and instructs a judged results to said coding system change order means.

7. The device as claimed in claim 3, wherein said network interworking device further comprises a plurality of decoding means for decoding the information signals of the respective calls disassembled by said packets disassembler means in accordance with different coding system, said decoded information signals being transmitted to said telephone-network.

8. A network interworking device used in a communication system which has a first communication network provided with an internet protocol and adapted to be connected to a plurality and adapted to be connected to a plurality of different users, a second communication network adapted to be connected to a plurality of different users, and a plurality of other networks interworking devices each provided with the same functions as that of said network interworking device and connected to said first communication network, said network interworking device being connected between said first communication network and said second communication network for converting internet protocol packets communicated in said first communication network and information signals communicated in said second communication network with each other, said network interworking device comprising:
- a packet assembler means for assembling information signals of a plurality of calls received from the plurality of different users in said second communication network into a single internet protocol packet when said plurality of calls are to be transmitted to the same network interworking device;
- a coding means for encoding the information signals of the respective calls received from said second communication network, said coded information signals being transferred to said packet assembler means;
- a packet disassembler means for disassembling an internet protocol packet received from said first communication network into information signals of a plurality of calls; and
- a decoding means for decoding the information signals of the respective calls disassembled by said packet disassembled means, said decoded information signals being transmitted to said second communication network,
- said internet protocol packet including a plurality of short packets with respect to the information signals of the respective calls received from the plurality of different users in said second communication network, a deadline for short packet transmission being determined for each short packet according to the second communication network, said packet assembler means transmitting the internet protocol packet to said first communication network when the deadline of any one of the short packets assembled in the internet protocol packet expires during the assembling of the short packets, and
- wherein said network interworking device further comprises a plurality of coding means for encoding the information signals of the respective calls received from said second communication network in accordance with different coding systems, said coded information signals being transferred to said packet assembler means.

9. The device as claimed in claim 8, wherein a header of each of the short packets has a communication channel number of each call.

10. The device as claimed in claim 8, wherein said second communication network is a telephone-network.

11. The device as claimed in claim 10, wherein said internet protocol packet includes a plurality of short packets with respect to the information signals of the respective calls received from said second communication network, wherein a header of each of the short packets has a coding system identifier, and wherein one of said coding means and a short packet length are selected depending upon said identifier for assembling the short packet in the internet protocol packet.

12. The device as claimed in claim 10, wherein said network interworking device further comprises a communication channel monitor means for automatically detecting contents of the information signals of the respective calls received from said second communication network, and a coding system change order means for instructing to select an optimum coding system depending upon the detected contents.

13. The device as claimed in claim 12, wherein said network interworking device further comprises a congestion monitor means for monitoring congestion status of said first communication network, said congestion monitor means judges whether it is in congestion status of the first communication network depending upon an inter-arrival time of the internet protocol packets or upon a loss ratio of the internet protocol packets, and instructs a judged result to said coding system change order means.

14. The device as claimed in claim 10, wherein said network interworking device further comprises a plurality of decoding means for decoding the information signals of the respective calls disassembled by said packet disassembler means in accordance with different coding system, said decoded information signals being transmitted to said telephone-network.

\* \* \* \* \*